United States Patent
Patel et al.

(10) Patent No.: US 7,761,179 B2
(45) Date of Patent: Jul. 20, 2010

(54) METHOD FOR CONSISTENT UPDATES TO AUTOMATED PROCESS CONTROL (APC) MODELS WITH PARTITIONING ALONG MULTIPLE COMPONENTS

(75) Inventors: Nital S. Patel, Mesa, AZ (US); Steven L. Carson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 456 days.

(21) Appl. No.: 11/860,515

(22) Filed: Sep. 24, 2007

(65) Prior Publication Data

US 2009/0082893 A1    Mar. 26, 2009

(51) Int. Cl.
*G06F 19/00* (2006.01)
(52) U.S. Cl. .................. 700/103; 700/104
(58) Field of Classification Search .......... 700/103, 700/104
See application file for complete search history.

(56) References Cited

U.S. PATENT DOCUMENTS

| | | | |
|---|---|---|---|
| 6,584,369 B2 | 6/2003 | Patel et al. | |
| 6,623,333 B1 | 9/2003 | Patel et al. | |
| 6,631,299 B1 | 10/2003 | Patel et al. | |
| 6,738,682 B1* | 5/2004 | Pasadyn | 700/100 |
| 6,757,579 B1* | 6/2004 | Pasadyn | 700/108 |
| 6,941,242 B2 | 9/2005 | Patel et al. | |
| 7,010,381 B2 | 3/2006 | Patel et al. | |
| 7,049,156 B2* | 5/2006 | Kueny | 438/16 |
| 7,295,815 B1* | 11/2007 | Wright et al. | 455/91 |
| 7,340,223 B1* | 3/2008 | Wright et al. | 455/91 |
| 7,424,331 B2 | 9/2008 | Patel | |
| 7,424,392 B1* | 9/2008 | Wang et al. | 702/182 |
| 2004/0185582 A1* | 9/2004 | Kueny | 438/7 |
| 2005/0031132 A1* | 2/2005 | Browning et al. | 381/59 |
| 2007/0174797 A1* | 7/2007 | Luo et al. | 716/4 |
| 2007/0230770 A1* | 10/2007 | Kulkarni et al. | 382/149 |
| 2008/0147228 A1 | 6/2008 | Fenner et al. | |

OTHER PUBLICATIONS

"Maximum Entropy Models with Inequality Constraints: A Case Study on Text Categorization", Kazama et al, Machine Learning, 60, 2005.*
"Adaptive Optimization of Run-To-Run Controllers: The EWMA Example", Nital S. Patel, IEEE Transactions on Semiconductor Engineering, vol. 13, No. 1, Feb. 2000.*
"Evaluation and Extension of Maximum Entropy Models with Inequality Constraits", Kazama et al, University of Tokyo Department of Computer Science. Date Unknown.*

(Continued)

*Primary Examiner*—Michael D Masinick
(74) *Attorney, Agent, or Firm*—Cool Patent, P.C.; Joseph P. Curtin (57) ABSTRACT

Methods for consistent updates to APC models with partitioning along multiple components are generally described. In one example, a method includes acquiring measurement data from one or more semiconductor wafers of a processed first lot, the data having a plurality of contexts, applying a model having parameters with partitioning along the contexts to the measurement data; and applying a constraint on a subset of the model parameters such that the subset remains centered around zero to provide consistent updates for automated process control of lots processed after the first lot.

13 Claims, 4 Drawing Sheets

OTHER PUBLICATIONS

Patel, Nital S., "Mix Issues in Process Control", Sematech AEC/APC Symposium XII, Sep. 25, 2000., pp. 1-27.

Braun, M W., et al., "A Comparison of Supervisory Control Algorithms for Tool/Process Disturbance Tracking", American Control Conference, Denver, Jun. 2003, pp. 2626-2631.

Pasadyn, Alexander J., et al., "Observability and State Estimation for Multiple Product Control in Semiconductor Manufacturing", IEEE Trans. on Semiconductor Mfg, Nov. 2005, pp. 592-604.

Hanish, Courtney K., et al., "Run-to-run State Estimation in Systems with Unobservable States", Sematech AEC/APC Symposium, Indian Wells, Adventa Control Technologies, Inc., (2005), 27 pages.

Patel, Nital S., et al., "Device Dependent Control of Chemical-Mechanical Polishing of Dielectric Films", IEEE Trans. on Semiconductor Mfg., Aug. 2000, pp. 331-343.

Stuber, John, "Automated Process Control at Texas Instruments Inc", Silicon Technology Development Texas Instruments Inc., Feb. 5, 2007, 32 pages.

* cited by examiner

METHOD FOR CONSISTENT UPDATES TO AUTOMATED PROCESS CONTROL (APC) MODELS WITH PARTITIONING ALONG MULTIPLE COMPONENTS

BACKGROUND

Generally, APC applications dealing with models having parameters partitioned along different contexts employ independent exponentially weighted moving average (EWMA) control loops to track these parameters.

BRIEF DESCRIPTION OF THE DRAWINGS

Embodiments disclosed herein are illustrated by way of example, and not by way of limitation, in the figures of the accompanying drawings in which like reference numerals refer to similar elements and in which.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

Embodiments of methods for consistent updates to APC models with partitioning along multiple components are described herein. In the following description, numerous specific details are set forth to provide a thorough understanding of embodiments disclosed herein. One skilled in the relevant art will recognize, however, that the embodiments disclosed herein can be practiced without one or more of the specific details, or with other methods, components, materials, and so forth. In other instances, well-known structures, materials, or operations are not shown or described in detail to avoid obscuring aspects of the specification.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Figure 1:
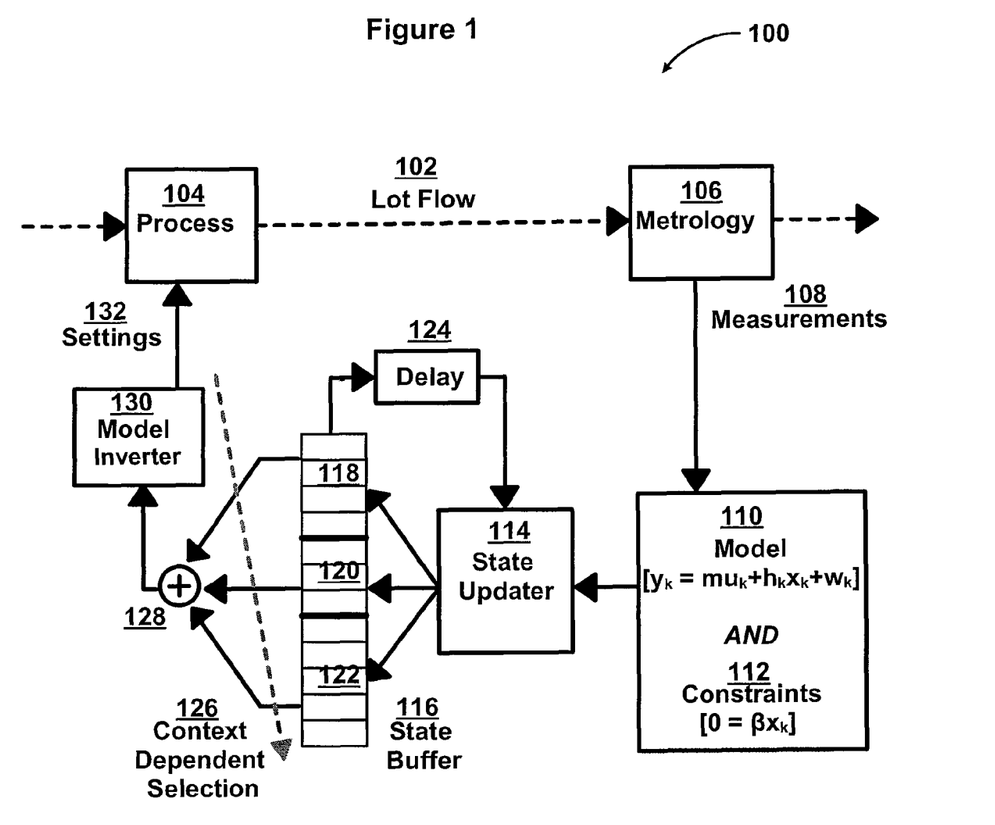
FIG. 1 is a conceptual flow of information for an APC system and constraint application, according to but one embodiment.

FIG. 1 is a conceptual flow of information for an APC system and constraint application 100, according to but one embodiment. In an embodiment, a method 100 includes a lot flow 102, process 104, metrology 106, measurements 108, model 110, constraints 112, state updater 114, state buffer 116, database contexts 118, 120, 122, delay 124, context-dependent selection 126, combination 128, model inverter 130, and settings 132, each coupled as shown with arrows providing a suggested flow.

APC applications dealing with models having parameters partitioned along different contexts may employ independent exponentially weighted moving average (EWMA) control loops to track these parameters. A fundamental issue with this approach is that no unique solution may satisfy the data resulting in bias drift and causing sporadic excursions resulting in scrap or rework. Existing methods may suffer from divergence because more parameters may exist than can be resolved; hence, the adaptation to the model error may incorrectly allocate updates to the wrong partition. For example, the estimation error may change across lot of semiconductor wafers being processed on semiconductor manufacturing equipment or tool. Hence, a wafer in the lot may be processed with incorrect offsets because a tool-bias term may not comprehend that the tool bias has changed by a different amount than the true tool drift. The likelihood of this effect increases as the number of contexts, such as the number of products, increases. Mitigating this effect with qualification runs is not always possible due to the sustaining effort involved in implementation. Moreover, the qualification runs may correlate poorly with the APC model or the qualification runs may not occur often enough. Present solutions may not counter the unobservable nature of the underlying models and thus may not provide consistent estimates.

A lot flow 102 may include actions associated with lot process 104 and metrology 106. A process 104 may include any action associated with manufacturing, packaging, assembling, and/or testing a microelectronic device, such as a die or a semiconductor wafer, for example. In an embodiment, a lot includes one or more semiconductor wafers that are typically processed 104 in a batch or run. A batch process 104 may include simultaneous process of wafers within a lot, such as loading a lot of wafers into a diffusion furnace. A run process 104 may include individual processing of wafers within a lot. Such run processing 104 may occur individually upon a wafer, but sequentially upon wafers within a lot. For example, a run may include processing 104 a lot of wafers on a lithography scanner in which spin, expose, and develop steps may occur on a first wafer within a lot and continue sequentially upon each wafer until all wafers within the lot have been similarly processed.

Metrology 106 may include measurements and/or tests 108 performed on one or more wafers of a lot. In an embodiment, metrology includes measurements, such as registration or overlay (REG), critical dimensions (CD), film thickness, e-test, spectroscopy, and/or defect detection. The provided metrology examples are merely exemplary and not exhaustive. Embodiments for a method described herein may include any other suitable measurement 108 associated with metrology 106.

In an embodiment, a measurement 108 includes multiple contexts. A context may be a factor that biases or affects the measurement datum or data 108. For example, in a semiconductor manufacturing environment, contexts may include product, tool, process step (i.e., layer), reticle, align-to reticle, align-to stepper/scanner, etcher, chamber ID, routes, plates, heads, any standardized descriptor of a process or equipment, a variety of other factors that may or may not bias measurements, or any suitable combination of these 108. According to an embodiment, a measurement 108 includes N contexts, in which N represents the number of contexts associated with the measurement 108.

A model 110 and/or constraints 112 may be applied to the measurement data 108. In one approach, a model 110 may accord with the following relationship in which k denotes the run number, $y_k$ are the measurements, m is assumed to be the known process gain, $u_k$ are the recipe settings, $w_k$ denotes noise, and it is assumed that $w_k$ is zero-mean and independent and identically distributed (iid), $\{a_k^J\}^N_{J=1}$ denote the unknown bias terms, $x_k$ is the column vector of all possible bias values assumed ordered by context for simplicity of discussion, and $h_k$ is a row vector of 1's and 0's, with 1's corresponding to the appropriate context values that are active for run k, each corresponding to one of the N contexts:

$$y_k = mu_k + a_k^1 + a_k^2 + \ldots + a_k^N + w_k = mu_k + h_k x_k + w_k \quad (1)$$

Such approach 110 leads to a system wherein one can have an infinite set of estimates to the bias terms that explain the observations unless one is able to restrict the solutions by the use of reference context values (i.e., qualification runs). In a case in which no reference contexts exist or insufficient contexts exist to obtain a unique solution, approaches in the past have focused on solvability of the estimation problem and not necessarily on the uniqueness of solutions. The lack of uniqueness may cause drifts in the relative tracking error resulting in sporadic excursions, in which lots of a specific context run off target due to a drift in the relative tracking error.

A disclosed method 100 may address the divergence problem in APC models by adding additional constraints 112 on the APC model parameters being estimated via model augmentation, in contrast to methods in which the model was either of the same order as the number of parameters, or was reduced by assuming fixed parameter values for specific contexts. An approach 110 may include a single arbitrary drift term (i.e., a term that accounts for a majority of the drift such as a context based on process tool), and the remaining bias is constrained 112 to be centered around zero. Such additional constraint 112 results in a unique solution to (1), according to an embodiment. In an embodiment, a recursive solution can be obtained via Kalman filtering or a recursive least squares method with optional forgetting. Forgetting may refer to a deweighting scheme that gives more effect to recent data than older data, for example. A recursive technique, such as Kalman filtering, may enable incorporation of a priori knowledge on bias behavior into the estimation scheme. For the sake of clarity, an additive bias model 110 is provided here (1) as an example; however, other models 110, such as multiplicative or rate models, are implemented according to other embodiments.

In an embodiment, a constraint 112 is applied on a subset of the free-model parameters (1) such that the subset remains centered around zero to enable consistent updates for automated process control. According to an embodiment, the constrained subset is of the following form, in which β is a matrix of context terms with 1's being assigned to constrained terms and 0's being assigned to unconstrained terms, $x_k$ is a vector of all possible bias values, and k is the lot run counter:

$$0 = \beta x_k \quad (2)$$

In an embodiment, an example system has three contexts, such that each context has three values. In such a system, applying a constraint to the second and third contexts (i.e. —assuming that the vector $x_k$ is ordered by context) results in a value of β as follows, according to one embodiment:

$$\beta = \begin{bmatrix} 0 & 0 & 0 & 1 & 1 & 1 & 0 & 0 & 0 \\ 0 & 0 & 0 & 0 & 0 & 0 & 1 & 1 & 1 \end{bmatrix} \quad (3)$$

In an embodiment according to (3), the leftmost three columns specify that there are no constraints applied to a first context, the middle three columns specify constraints on a second context, and the rightmost three columns specify constraints on a third context. In an embodiment, a constrained subset 112 of parameters includes contexts for which no qualification data exists or that are constant or near constant. In another embodiment, applying a constraint 112 on a subset of parameters is accomplished by setting the sum of the values within each of the N−1 contexts equal to zero, in which N is the number of contexts. In an embodiment, a single partition context accounts for a majority of the drifting terms while the remainder of constant or near constant terms are constrained 112 to be set around zero. Applying constraints 112 such that a subset of parameters is centered around zero may be intuitively appealing for engineers who support an APC system. In an embodiment, such constraint 112 enables better default value estimates for New Product Introductions (NPI) for which no prior measurement data exists.

A solution to the model 110 with applied constraints 112 may be postulated in the form of recursive updates. A state updater 114 may provide such recursive function. In an embodiment, a state updater 114 implements Kalman filtering or a recursive least-squares approach with optional forgetting to provide recursive updates. In an embodiment, a state updater 114 provides recursive updates to a state buffer 116 having context-dependent storage 118, 120, 122. In an embodiment, a state buffer includes database contexts 118, 120, 122 for different contexts, such as process step 118, tool 120, or product 122, for example. More or less contexts than depicted may exist in other embodiments.

Feedback of context-dependent estimates may be provided to a state updater 114 through delay 124 in a recursive fashion to converge on new context-dependent estimates that are sent to state buffer 116. Delay 124 may refer to a delay in a prior estimate for a next estimate by at least one lot. Context-dependent selection 126 may refer to the characteristic that a single estimate for each context is combined 128 into a model inverter 130. A model inverter 130 may calculate offsets that are to be applied to process settings 132 for a lot. An inverter 130 in this description may be a mechanism or algorithm to generate the inverse of the model. In an example, a lot of product X may be placed on tool A for process step Y. The estimates in state buffer 116 for product X 118, tool A 120, and step Y 122 may be combined into model inverter 130 to calculate offsets that are to be applied to updated process settings 132.

Figure 2:
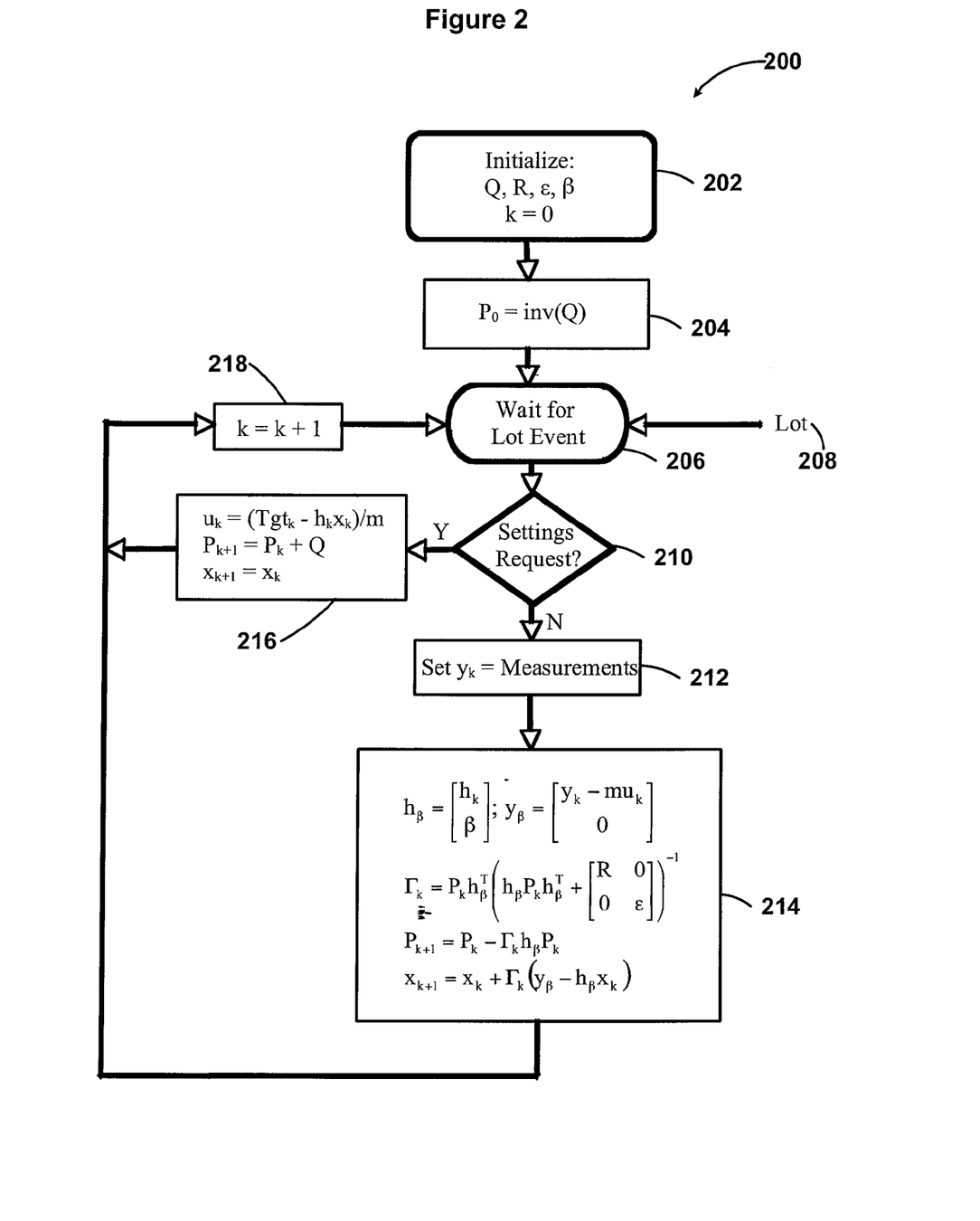
FIG. 2 is a flow diagram of an APC method and constraint application, according to but one embodiment.

FIG. 2 is a flow diagram of an APC method and constraint application 200, according to but one embodiment. In an embodiment, a method 200 includes initializing terms 202, initializing $P_0$ 204, waiting for lot event 206, lot 208, settings request 210, setting measurements 212, applying a model and constraints including a Kalman filter realization of the model parameter estimator 214, calculating settings and applying a common filter 216, and incrementing lot counter 218, with arrows providing a suggested flow. In an embodiment, a flow diagram 200 depicts a scheme for a Kalman filter realization of a model parameter estimator 214. For purposes of the Kalman filter definition, it is assumed that the true parameters are drifting from run-to-run subject to zero mean independent and identically distributed (iid) noise $v_k$ as follows, according to one embodiment:

$$x_{k+1} = x_k + v_k \quad (4)$$

Initialization 202 of terms may include initializing Q, R, ϵ, β, and k, in which Q is equal to cov($v_k$), R is cov($w_k$), ϵ is any positive number, β defines the context specific constraints as defined before, and k is the lot run counter. In an embodiment, initializing 202 includes setting k =0, and initializing Q, R, ϵ, or β with estimate values. $P_0$ may be initialized 204 such that $P_0$ =inv(Q). Waiting for a lot event 206 may include waiting for lot 208 process or measurement as already described with respect to FIG. 1. Lot 208 may follow a lot flow that includes processing the lot 208 and/or measuring the lot 208.

A settings request 210 may distinguish whether the lot event 206 is for processing the lot 208 or measuring the lot 208. If a settings request 210 is made for processing a lot, then the "Yes" decision path may be followed to action 216 where a model inverter may calculate recipe settings for processing the lot 208. A model inverter may calculate settings according to the following relationship where $u_k$ denote the settings to be used for processing lot k, $Tgt_k$ is the desired target value for the measurements $y_k$:

$$u_k = (Tgt_k - h_k x_k)/m \qquad (5)$$

Additionally, the estimated error covariance matrix ($P_k$) is updated as follows, according to an embodiment:

$$P_{k+1} = P_k + Q \qquad (6)$$

If a settings request 210 is not made, then the "No" decision path may be followed to action 212 where $y_k$ is set equal to the measurements 212. In an embodiment, a model and constraints 214 are applied to measurement data according to the following relationship:

$$y_\beta = h_\beta x_k \qquad (7)$$

in which $h_\beta$ and $y_\beta$ are defined according to the following:

$$h_\beta = \begin{bmatrix} h_k \\ \beta \end{bmatrix}; y_\beta = \begin{bmatrix} y_k - mu_k \\ 0 \end{bmatrix} \qquad (8)$$

In an embodiment, Kalman filtering 214 is implemented to provide recursive updates to model parameter estimates. In one example, applying a model and constraints with a Kalman filter updating scheme improves the root mean square error (RMSE) of overlay measurements by about 12% over an exponentially weighted moving average (EWMA) scheme and provides a tighter distribution of error from target over an EWMA scheme. Kalman filtering 214 may accord with the following relationships in an embodiment, in which $\Gamma_k$ is the Kalman gain, and $x_k$ is the estimated value of the model parameter:

$$\Gamma_k = P_k h_\beta^T \left( h_\beta P_k h_\beta^T + \begin{bmatrix} R & 0 \\ 0 & \varepsilon \end{bmatrix} \right)^{-1}$$

$$P_{k+1} = P_k - \Gamma_k h_\beta P_k$$

$$x_{k+1} = x_k + \Gamma_k (y_\beta - h_\beta x_k)$$

The lot increment counter 218, k, may be incremented by one after a lot event occurs and the flow may return to waiting for a lot event 206. Actions and/or calculations 206, 210, 212, 214, and 218 may repeat for each new lot measurement. Actions and/or calculations 206, 210, 216, and 218 may repeat for each new lot being processed.

Figure 3:
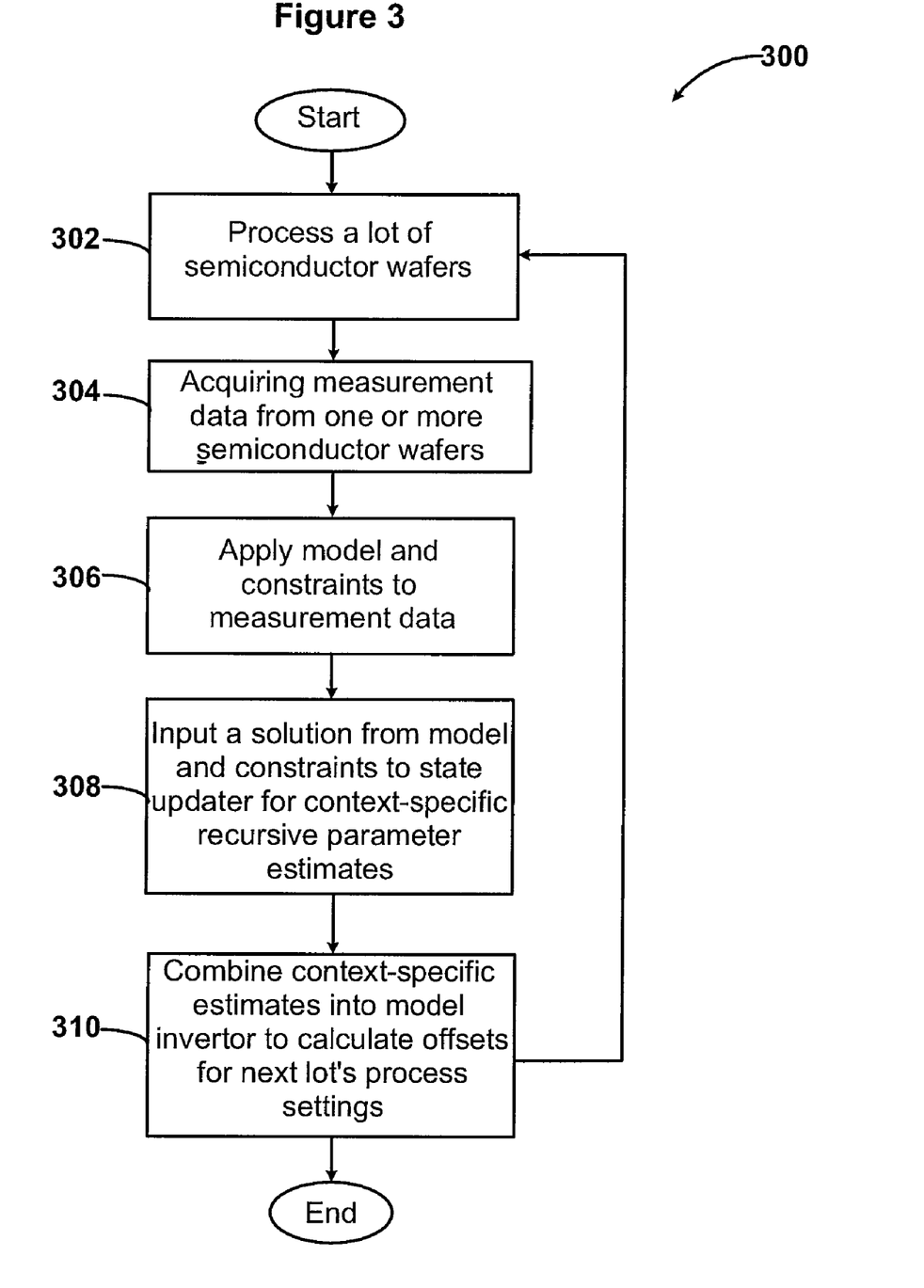
FIG. 3 is a flow diagram of a method for consistent updates to an APC model, according to but one embodiment.

FIG. 3 is a flow diagram of a method for consistent updates to an APC model 300, according to but one embodiment. In an embodiment, a method 300 includes processing a lot of semiconductor wafers 302, acquiring measurement data from one or more measurements on one or more semiconductor wafers 304, applying a model and constraints to measurement data 306, inputting or feeding a solution or estimate from model and constraints to state updater for context-specific recursive parameter estimates 308, and combining context-specific estimates into model inverter to calculate offsets process settings 310 for a next lot, with arrows providing a suggested flow.

In an embodiment, a method 300 includes processing a first lot, the first lot including one or more semiconductor wafers 302, acquiring measurement data from one or more semiconductor wafers of the first lot, the data having N contexts in which N is the number of contexts 304, applying a model with partitioning along N contexts, the model comprising the form $y_k = mu_k + h_k x_k + w_k$ to the measurement data, in which $y_k$ is the measurement data, $h_k$ is a row vector of 1's and 0's with the value of 1 assigned to the active context values, $x_k$ is a vector of all possible bias values, $w_k$ is noise, and k is the lot run counter, in which a solution to the model is postulated in the form of recursive updates, and applying a constraint on a subset of the model parameters such that the subset remains centered around zero to enable consistent updates for automated process control, the constraint comprising the form $0 = \beta x_k$, in which β is a matrix of context terms with 1's being assigned to constrained terms and 0's being assigned to unconstrained terms, $x_k$ is a vector of all possible bias values, and k is the lot run counter. A method 300 may include a recursive scheme, such a Kalman filter or recursive least squares method, with optional forgetting to provide update estimates.

A method 300 may also include inputting a solution from the applied model to a state updater that implements Kalman filtering or a recursive least squares method with optional forgetting, or suitable combinations thereof, to converge on context-specific parameter estimates 308, and combining context-specific parameter estimates into a model inverter to calculate offsets process settings 310 for a second lot. In an embodiment, a method 300 also includes processing the second lot using settings that incorporate the context-specific offsets calculated by the model inverter. A method 300 may incorporate embodiments already described with respect to FIGS. 1-2.

Various operations may be described as multiple discrete operations in turn, in a manner that is most helpful in understanding the invention. However, the order of description should not be construed as to imply that these operations are necessarily order dependent. In particular, these operations need not be performed in the order of presentation. Operations described may be performed in a different order than the described embodiment. Various additional operations may be performed and/or described operations may be omitted in additional embodiments.

An apparatus that executes the above-specified process 300 is also described. The apparatus includes a machine-readable storage medium having executable instructions that enable the machine to perform the actions in the specified process. An article of manufacture is also described; the article of manufacture includes a storage medium having instructions stored thereon that, if executed, result in the actions of method 300 or methods associated with FIGS. 1-3 already described.

Figure 4:
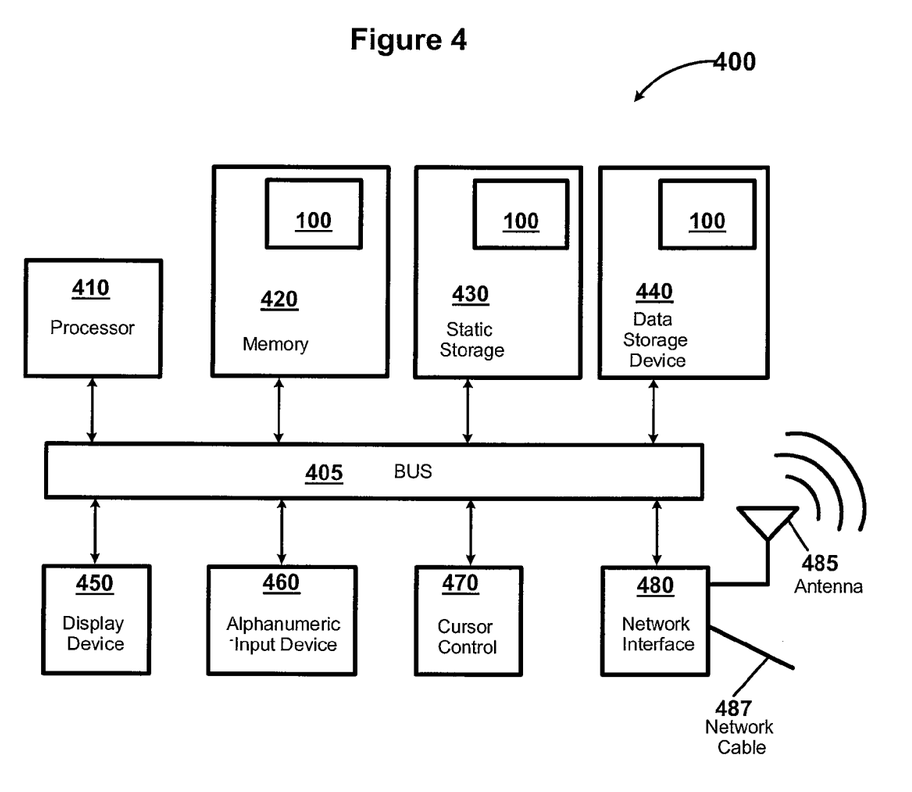
FIG. 4 is an example system in which embodiments of the present invention may be used, according to but one embodiment.

FIG. 4 is a diagram of an example system in which embodiments of the present invention may be used 400, according to but one embodiment. For example, an article of manufacture 100 that includes a storage medium having instructions stored thereon that, if executed, result in the actions of methods described with respect to FIGS. 1-3 may be included in memory 420, static storage 430, or data storage device 440 of a system 400. System 400 is intended to represent a range of electronic systems (either wired or wireless) including, for example, desktop computer systems, laptop computer systems, personal computers (PC), wireless telephones, personal digital assistants (PDA) including cellular-enabled PDAs, set top boxes, pocket PCs, tablet PCs, DVD players, or servers, but is not limited to these examples and may include other electronic systems. Alternative electronic systems may include more, fewer and/or different components.

Electronic system 400 may include bus 405 or other communication device to communicate information, and processor 410 coupled to bus 405 that may process information. While electronic system 400 may be illustrated with a single processor, system 400 may include multiple processors and/or co-processors. System 400 may also include random access memory (RAM) or other storage device 420 (may be referred to as memory), coupled to bus 405 and may store information and instructions that may be executed by processor 410. In an embodiment, memory 420 includes a storage medium having instructions stored thereon that, if executed, result in the actions of methods described with respect to FIGS. 1-3.

Memory 420 may also be used to store temporary variables or other intermediate information during execution of instructions by processor 410. Memory 420 is a flash memory device in one embodiment.

System 400 may also include read only memory (ROM) and/or other static storage device 430 coupled to bus 405 that may store static information and instructions for processor 410. In an embodiment, static storage device 430 includes a storage medium having instructions stored thereon that, if executed, result in the actions of methods described with respect to FIGS. 1-3. Data storage device 440 may be coupled to bus 405 to store information and instructions. Data storage device 440 such as a magnetic disk or optical disc and corresponding drive may be coupled with electronic system 400. In an embodiment, memory data storage device 440 includes a storage medium having instructions stored thereon that, if executed, result in the actions of methods described with respect to FIGS. 1-3.

Electronic system 400 may also be coupled via bus 405 to display device 450, such as a cathode ray tube (CRT) or liquid crystal display (LCD), to display information to a user. Alphanumeric input device 460, including alphanumeric and other keys, may be coupled to bus 405 to communicate information and command selections to processor 410. Another type of user input device is cursor control 470, such as a mouse, a trackball, or cursor direction keys to communicate information and command selections to processor 410 and to control cursor movement on display 450.

Electronic system 400 further may include one or more network interfaces 480 to provide access to network, such as a local area network. Network interface 480 may include, for example, a wireless network interface having antenna 485, which may represent one or more antennae. Network interface 480 may also include, for example, a wired network interface to communicate with remote devices via network cable 487, which may be, for example, an Ethernet cable, a coaxial cable, a fiber optic cable, a serial cable, or a parallel cable.

In one embodiment, network interface 480 may provide access to a local area network, for example, by conforming to an Institute of Electrical and Electronics Engineers (IEEE) standard such as IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Previous or subsequent versions of the Bluetooth standard may also be supported.

In addition to, or instead of, communication via wireless LAN standards, network interface(s) 480 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In an embodiment, a system 400 includes one or more omnidirectional antennae 485, which may refer to an antenna that is at least partially omnidirectional and/or substantially omnidirectional, and a processor 410 coupled to communicate via the antennae. In an embodiment, a network interface 480 receives instructions from an article of manufacture that includes a storage medium having instructions stored thereon that, if executed, result in the actions of methods described with respect to FIGS. 1-3.

The above description of illustrated embodiments, including what is described in the Abstract, is not intended to be exhaustive or to limit to the precise forms disclosed. While specific embodiments and examples are described herein for illustrative purposes, various equivalent modifications are possible within the scope of this description, as those skilled in the relevant art will recognize.

These modifications can be made in light of the above detailed description. The terms used in the following claims should not be construed to limit the scope to the specific embodiments disclosed in the specification and the claims. Rather, the scope of the embodiments disclosed herein is to be determined entirely by the following claims, which are to be construed in accordance with established doctrines of claim interpretation.

What is claimed is:

1. A method, comprising:
acquiring measurement data from one or more semiconductor wafers of a processed first lot, the data comprising a plurality of contexts;
applying a model comprising parameters with partitioning along the contexts to the measurement data; and
applying a constraint on a subset of the model parameters such that the subset remains centered around zero to provide consistent updates for automated process control of lots processed after the first lot,
wherein applying the model comprises applying a model of the form $$y_k = m u_k + h_k x_k + w_k$$

to the measurement data, in which $y_k$ comprises the measurement data, $h_k$ comprises a row vector of 1s and 0s with 1s being assigned to the active context values, $x_k$ comprises a vector of all possible bias values, $w_k$ comprises noise, m comprises the known process gain, $u_k$ comprises the recipe settings used to process the lot, and k comprises the lot run counter, wherein a solution for the parameter estimates, $x_k$, is postulated in the form of recursive updates, and wherein applying a constraint comprises applying a constraint of the form $0=\beta x_k$, in which $\beta$ comprises a matrix of context terms with 1s being assigned to constrained terms and 0s being assigned to unconstrained terms.

2. A method according to claim 1, wherein the recursive updates for the parameter estimates, $x_k$, are implemented using a recursive least squares method with optional forgetting or Kalman filtering according to the following relationships:

$$h_\beta = \begin{bmatrix} h_k \\ \beta \end{bmatrix}; y_\beta = \begin{bmatrix} y_k - mu_k \\ 0 \end{bmatrix}$$

$$\Gamma_k = P_k h_\beta^T \left( h_\beta P_k h_\beta^T + \begin{bmatrix} R & 0 \\ 0 & \epsilon \end{bmatrix} \right)^{-1}$$

$$P_{k+1} = P_k - \Gamma_k h_\beta P_k$$

$$x_{k+1} = x_k + \Gamma_k (y_\beta - h_\beta x_k)$$

in which $\Gamma_k$ is the Kalman gain as defined above, $P_k$ comprises an error covariance matrix recursively updated as above, R comprises cov($w_k$), $\epsilon$ comprises a positive number, and k comprises a lot run counter.

3. A method according to claim 2, further comprising:
calculating settings according to the relationship $u_k = (Tgt_k - h_k x_k)/m$, in which $u_k$ denotes the settings to be used for processing lot run number k and $Tgt_k$ comprises the desired target value for the measurements, $y_k$; and
updating the error covariance matrix according to the relationship $P_{k+1}=P_k+Q$, in which Q comprises cov($v_k$), and in which $v_k$ comprises parameter noise.

4. A method according to claim 1, wherein acquiring measurement data comprises acquiring measurement data comprising N contexts in which N comprises the number of contexts, and wherein applying a constraint comprises applying a constraint on a subset of the model parameters, the subset comprising contexts for which no qualification data exists or that are constant or near constant, and wherein applying a constraint on the subset is accomplished by setting the sum of the values within each of the N−1 contexts equal to zero.

5. A method according to claim 1, wherein the contexts comprise product, tool, process step, reticle, align-to reticle, align-to stepper or scanner, etcher, chamber ID, route, plate, head, or suitable combinations thereof.

6. A method according to claim 1, further comprising:
inputting a solution from the applied model to a state updater, wherein the state updater implements Kalman filtering or a recursive least squares method, or suitable combinations thereof, to converge on context-specific parameter estimates; and
combining context-specific parameter estimates into a model inverter to calculate offsets process settings for a second lot.

7. A method according to claim 6, further comprising:
processing the second lot using settings that incorporate the context-specific offsets calculated by the model inverter.

8. An article of manufacture comprising a storage medium having instructions stored thereon that, if executed, result in:
acquiring measurement data from one or more semiconductor wafers of a processed first lot, the data comprising a plurality of contexts;
applying a model comprising parameters with partitioning along the contexts to the measurement data; and
applying a constraint on a subset of the model parameters such that the subset remains centered around zero to provide consistent updates for automated process control of lots processed after the first lot,
wherein applying the model comprises applying a model of the form $y_k = mu_k + h_k x_k + w_k$ to the measurement data, in which $y_k$ comprises the measurement data, $h_k$ comprises a row vector of 1s and 0s with 1s being assigned to the active context values, $x_k$ comprises a vector of all possible bias values, $w_k$ comprises noise, m comprises the known process gain, $u_k$ comprises the recipe settings used to process the lot, and k comprises the lot run counter, wherein a solution for the parameter estimates, $x_k$, is postulated in the form of recursive updates, and wherein applying a constraint comprises applying a constraint of the form $0=\beta x_k$, in which $\beta$ comprises a matrix of context terms with 1s being assigned to constrained terms and 0s being assigned to unconstrained terms.

9. An article of manufacture as claimed in claim 8, wherein the recursive updates for the parameter estimates, $x_k$, are implemented using a recursive least squares method with optional forgetting or Kalman filtering according to the following relationships:

$$h_\beta = \begin{bmatrix} h_k \\ \beta \end{bmatrix}; y_\beta = \begin{bmatrix} y_k - mu_k \\ 0 \end{bmatrix}$$

$$\Gamma_k = P_k h_\beta^T \left( h_\beta P_k h_\beta^T + \begin{bmatrix} R & 0 \\ 0 & \epsilon \end{bmatrix} \right)^{-1}$$

$$P_{k+1} = P_k - \Gamma_k h_\beta P_k$$

$$x_{k+1} = x_k + \Gamma_k (y_\beta - h_\beta x_k)$$

in which $\Gamma_k$ is the Kalman gain as defined above, $P_k$ comprises an error covariance matrix recursively updated as above, R comprises cov($w_k$), $\epsilon$ comprises a positive number, and k comprises a lot run counter.

10. An article of manufacture as claimed in claim 9, wherein the instructions, if executed, further result in:
calculating settings according to the relationship $u_k = (Tgt_k - h_k x_k)/m$, in which $u_k$ denotes the settings to be used for processing lot run number k and $Tgt_k$ comprises the desired target value for the measurements, $y_k$; and
updating the error covariance matrix according to the relationship $P_{k+1}=P_k+Q$, in which Q comprises cov($v_k$), and in which $v_k$ comprises parameter noise.

11. An article of manufacture as claimed in claim 8, wherein acquiring measurement data comprises acquiring measurement data comprising N contexts in which N comprises the number of contexts, and wherein applying a constraint comprises applying a constraint on a subset of the model parameters, the subset comprising contexts for which no qualification data exists or that are constant or near constant, and wherein applying a constraint on the subset is accomplished by setting the sum of the values within each of the N−1 contexts equal to zero.

12. An article of manufacture as claimed in claim 8, wherein the instructions, if executed, further result in:

inputting a solution from the applied model to a state updater, wherein the state updater implements Kalman filtering or a recursive least squares method, or suitable combinations thereof, to converge on context-specific parameter estimates; and combining context-specific parameter estimates into a model inverter to calculate offsets process settings for a second lot.

13. An article of manufacture as claimed in claim 12, wherein the instructions, if executed, further result in:

processing the second lot using settings that incorporate the context-specific offsets calculated by the model inverter.

* * * * *

UNITED STATES PATENT AND TRADEMARK OFFICE
CERTIFICATE OF CORRECTION

PATENT NO. : 7,761,179 B2  Page 1 of 1
APPLICATION NO. : 11/860515
DATED : July 20, 2010
INVENTOR(S) : Nital S. Patel et al.

It is certified that error appears in the above-identified patent and that said Letters Patent is hereby corrected as shown below:

On Title page, item (56), under "OTHER PUBLICATIONS", in column 2, line 8, delete "Constraits"," and insert -- Constraints", --, therefor.

In column 9, line 31, in claim 2, delete "εcomprises" and insert -- ε comprises --, therefor.

Signed and Sealed this

Fourteenth Day of December, 2010

David J. Kappos
*Director of the United States Patent and Trademark Office*